United States Patent
Sekar

Patent Number: 6,159,134
Date of Patent: Dec. 12, 2000

[54] METHODS FOR MANUFACTURING A PAINT ROLLER WITH INTEGRATED CORE AND COVER

[76] Inventor: Chandra Sekar, 4 Sunset Rd., Searington, N.Y. 11507

[21] Appl. No.: 09/304,862

[22] Filed: May 4, 1999

[51] Int. Cl.$^7$ .................................................. B05C 1/08
[52] U.S. Cl. .................. 492/13; 29/895.211; 29/895.21; 29/527.2; 492/17
[58] Field of Search .......................... 29/895.211, 895.21, 29/527.2; 492/17, 13

[56] References Cited

U.S. PATENT DOCUMENTS

| | | |
|---|---|---|
| 2,255,887 | 9/1941 | Katz . |
| 2,331,969 | 10/1943 | Friedrichs et al. . |
| 2,422,842 | 6/1947 | Molyneux et al. . |
| 3,018,212 | 1/1962 | Chinn . |
| 3,274,905 | 9/1966 | Demsey, Jr., et al. . |
| 3,411,931 | 11/1968 | Burns et al. . |
| 3,457,130 | 7/1969 | Morrison . |
| 3,460,445 | 8/1969 | Ried . |
| 3,687,778 | 8/1972 | Cichoski et al. . |
| 3,700,520 | 10/1972 | Hielema . |
| 3,960,624 | 6/1976 | Erlandson . |
| 4,165,956 | 8/1979 | Hendy . |
| 4,191,792 | 3/1980 | Janseen . |
| 4,689,003 | 8/1987 | Schreiner et al. . |
| 4,692,975 | 9/1987 | Garcia . |
| 5,146,646 | 9/1992 | Langford et al. . |
| 5,195,242 | 3/1993 | Sekar . |
| 5,398,409 | 3/1995 | Sekar . |
| 5,572,790 | 11/1996 | Sekar . |
| 5,862,591 | 1/1999 | Kulkaski . |

FOREIGN PATENT DOCUMENTS

| | | |
|---|---|---|
| 0069335 | 6/1982 | European Pat. Off. . |
| 0 744275A2 | 11/1996 | European Pat. Off. . |
| DT1928269 | 6/1969 | Germany . |
| 55-19511 | 2/1980 | Japan . |
| 63-027234A | 2/1988 | Japan . |
| 63-027238 | 6/1988 | Japan . |
| 2020431 | 1/1989 | Spain . |

*Primary Examiner*—P. W. Echols
*Assistant Examiner*—Anthony L. Green
*Attorney, Agent, or Firm*—Greenberg Traurig LLP

[57] ABSTRACT

A reusable multi-strip laminate paint roller and method for manufacturing the same. The method comprising steps of: advancing a first strip of polypropylene material about a mandrel; advancing a second strip of polypropylene about a mandrel in offset relation to the first strip; advancing a cover about the second strip of polypropylene; providing a first adhesive layer (preferably a liquefied polypropylene) between the first and second strips of polypropylene; providing a second adhesive layer between the second strip of polypropylene and the cover; and applying a compressing force upon the cover urging the cover toward the second strip and simultaneously urging the second strip toward the first strip, thereby creating the continuous laminated paint roller. After forming of the continuously paint roller it is moved towards a cutter by a helical drive belt system. The continuously formed roller is then preferably cut into lengths for movement to a finishing station, and then cut into finished size paint rollers.

39 Claims, 5 Drawing Sheets

METHODS FOR MANUFACTURING A PAINT ROLLER WITH INTEGRATED CORE AND COVER

FIELD OF THE INVENTION

This invention pertains to a method and apparatus for making paint rollers of the type used for applying paint to walls and the like. More specifically, the invention pertains to a method and apparatus for making paint rollers having thermoplastic (and preferably polypropylene) cores that are formed in a single-step continuous process.

BACKGROUND OF THE INVENTION

Prior Art

Paint rollers are widely used by professionals and amateurs for applying paint to walls, ceilings, and other surfaces. Typically the roller is used with an applicator having a handle terminating in a rotatable member to which the roller is secured. The roller itself generally comprises a paint absorbing and spreading cover affixed to a generally cylindrical core. The covers may be made from materials such as wool or polyester, and other cover materials that are well known in the art.

Years ago paint rollers were manufactured using a paper or chipboard core. Some manufacturers still make such paper core paint rollers. The manufacture of such cores is well known. Such cores, however, and the paint rollers made out of them, would often fall apart during use or during cleaning, especially during cleaning with paint solvents (such as, for example, turpentine or mineral spirits, such paint solvents are well known in the art). It has always been desirable, and still remains desirable, to make the paint roller resistant to paint solvents.

An advance in making paint rollers came when the paper cores were replaced with phenolic cores, that is, cores made from paper impregnated with phenolic. Such paint rollers withstood exposure to paint solvents much better than their paper or chipboard counterparts. The process of manufacturing phenolic cores is also well known. For example, according to one known technique, a reusable disposable roller is made by first feeding three phenolic impregnated paper strips at an angle to a mandrel for overlapping, helical winding to form an endless core. Typically, the phenolic strips are supplied in rolls that can be mounted on spindles for continuous feeding, and a continuous thermosetting glue is applied to the outer surfaces of the strips as they feed off the rollers such that the strips adhere together as they are helically wound to form the core. As the endless core is belt driven down the line, the core is heated in a multi-stage infrared heater, after which a hot melt glue is applied to the core's outer surface and a continuous strip of the cover material, such as polyester, is helically wound on to the core where it is secured by the hot melt. All that remains is to cut the resulting endless roller down to usable sizes, which is usually accomplished in two steps, first using a fly away cutter to cut, e.g., 65 inch stock, and then using another cutter to cut the stock into usable lengths of, e.g., seven or nine inches.

The obvious drawback of reusable cores formed in this manner is that they require a long assembly line, due to the need of a heater, and because the phenolic must be heated to a predetermined temperature, there is an obvious trade off between the number of heater stages and the speed of the line. Additionally, while the resulting rollers are termed reusable because they do not separate when placed in paint solvents, any prolonged exposure to such solvents, does result in breakdown of the paint roller and/or separation of the layers. Moreover, the manufacturing process for making phenolic core rollers is environmentally unfriendly.

Another reusable roller is disclosed in U.S. Pat. No. 4,692,975 issued to Garcia, wherein the roller is formed using a preformed core made of thermoplastic (e.g. polypropylene) tubular stock. In particular, the process disclosed mounting a preformed core on a rotating spindle, providing a carriage movable in a direction parallel to the spindle, and providing on the carriage a direct heat source and, at an angle to the spindle a continuous strip of fabric. The disclosed process consisted of igniting the direct heat source to begin heating the outer surface of the tubular stock and moving the carriage parallel to the spindle in timed relation to the spindle's rotation so that the fabric strip is wound on the heated portion of the plastic core in a tight helix. The heated portion of the plastic core was thereby heat-softened just in advance of the point where the fabric strip is applied, such that the fabric is bonded to the core as it is wound thereon. In effect, a portion of the it polypropylene core surface is used as the bonding adhesive. One advantage of the roller disclosed in the Garcia patent is that the bond formed between cover and core is a strong one not easily subject to separation from exposure to paint solvents. Another advantage is that the manufacturing process does not require the application of a separate adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the polypropylene core, in the absence of which the fabric cover will not bond. In addition, the application of direct heat to the preformed polypropylene core presents manufacturing hazards from the heat source and from the fumes and/or chemicals released during the heating process.

U.S. Pat. No. 5,195,242 issued to the present inventor resolved many of the foregoing problems by (i) forming the thermoplastic core on the fly instead of using preformed cores, and (ii) using preheated thermoplastic as a glue, both to form the core by applying it between the strips forming the core, and to affix the cover to the core by applying it to the outside of the core before wrapping the cover thereabout. The patent describes a process involving the wrapping of three strips of thermoplastic material (preferably polypropylene) around a mandrel in overlapping relation to form a core, the strips making the core are bonded together by applying a liquefied thermoplastic material (again, preferably polypropylene) thereto prior to wrapping them about the mandrel. After the core is thus formed a liquefied thermoplastic (again, preferably polypropylene) is applied to the outer surface of the core, and a cover wrapped thereupon. All that remains, as is well known, is to cut the resulting endless roller down to usable sizes, which, as described above may be accomplished in two steps, first using a fly away cutter to make longer lengths, and then using another cutter to cut the stock into usable lengths. While this process was capable of making high quality rollers that were substantially unaffected by paint solvents, the process involved the use of multiple strips of thermoplastic material and numerous points of application for liquefied thermoplastic. As a result, the process was difficult to set up, and required many continuous adjustments in its operation.

U.S. Pat. No. 5,468,207 issued to Bower discloses a continuous process like that disclosed in the '242 patent, except that Bower discloses using direct heat to bond the surface of the thermoplastic plastic strips instead of applying liquefied thermoplastic to the strips to bond them together. Additionally, Bower discloses using direct heat to the surface of the core to bond the cover rather than applying liquefied thermoplastic prior to applying the cover.

U.S. Pat. No. 5,572,790, also issued to the present inventor, among other things, resolved some of the complexity problems of the foregoing process. Under this process, which has become the de facto standard for roller manufacturing today, instead of forming a core by winding a plurality of strips in overlapping relation about a mandrel, and then affixing a cover thereto, it was disclosed to wind only a single strip about the mandrel, the adjacent edges thereby placed in a closely-spaced or abutting relation. A liquefied thermoplastic material (preferably, polypropylene) is then applied to the exposed surface of the wound strip, and a roller is formed by helically winding the cover over the liquefied material and the wound strip with sufficient tensile force so that the fabric cover lays smoothly thereupon. Again, as with other endless roller manufacturing, a fly-away cutter may be first used to cut the product into longer lengths, and then such lengths may be cut to usable lengths. This process represented an advance over the previous method invented by the present inventor because the entire paint roller was formed in a single step which made the assembly line easier to manage as there was only a single strip of material and a single application of liquefied thermoplastic. The resulting roller, however, is somewhat inferior. More specifically, a defect present in all such rollers, manifests itself as a weak point, often sticking out from the ends of a cut roller, or making the ends of the cut roller appear "out of round." This results from the high tension memory of the strip which tends toward unwinding or toward "open" with high hoop strength. Moreover, to achieve the desirable hardened feel of the multi-layer rollers, the single strip rollers are generally made using a thicker plastic strip. The thicker the plastic strip used, (especially in relation to the diameter of the core) the more pronounced the memory effect appears on the roller.

Another process for manufacturing thermoplastic paint rollers was disclosed in a very recently issued patent application. Specifically, U.S. Pat. No. 5,862,591 discloses another method of forming a paint roller in a single step. In this process, strips of thermoplastic are not used, and instead, a fluidized polypropylene is applied directly to a mandrel, and a cover is placed thereupon. The application of fluidized polypropylene to a mandrel has concomitant complications in synchronization and in the problems inherent in working with consistency of application of a fluidized layer in forming a polypropylene core. Like this process, other proposals have been made for placing the pile fabric on a heated core, as for example in French Patent Publication 2,093,060, in which pile fabric is placed on a hot, freshly extruded core. It is, however, believed that no such system has gone into practical use, possibly because of the difficulties associated with controlling the shrinkage variation which inevitably occurs in the matching of what is essentially a through heated core blank or strip blank and a cold (i.e., room temperature, for example) pile fabric.

SUMMARY OF THE INVENTION

It is an object of the present invention to provide an improved and less complex method for forming a reusable paint roller comprising a laminated core and a fully integrated cover.

It is another object of the present invention to provide a simplified process for manufacturing paint rollers having a laminate core formed from two polypropylene strips.

It is another object of the present invention to provide a method and apparatus for the manufacture of high quality paint rollers in an extremely compact assembly area.

It is a further object of the present invention to provide a method whereby small cross sectional diameter paint rollers can be readily constructed in a continuous process.

Generally the present invention comprises a method for producing a paint roller in a single continuous integrated operation. The method of the present invention comprises the steps of: helically advancing a first strip of thermoplastic material about a mandrel; helically advancing a second strip of thermoplastic material about the first strip of thermoplastic material in offset relation therewith; helically advancing a cover about the second strip; providing an adhesive between the outer surface of the first strip and the inner surface of the second strip; providing an adhesive between the outer surface of the outer strip and the inner surface of the cover; and forming a continuous laminated paint roller by applying a compressive force upon the cover.

In a preferred embodiment of the present invention the cover strip and adjacent adhered second polypropylene strip are laterally offset from each other whereby the cover strip spans adjacent windings of the second polypropylene strip. This provides additional structural strength in maintaining the rigidity of the roller. This is believed to be a significant factor in making small diameter rollers, which cannot be practically made by prior art, single strip methods of roller production.

Rollers made in accordance with the present invention provide sufficient resistance against unfurling of the core material to an extent whereby rollers of small diameter (0.5" roller core diameter as opposed to more common 1.5" cores) are made with utilizable structural integrity and resistance against end separation of strips.

Furthermore, as opposed to single-strip rollers made in accordance with the prior art, the integral roller core and cover material rollers of the present invention, when longitudinally slit, do not spring open, but instead substantially retain their original configurations, thereby demonstrating the different product so made.

The core and the roller are formed in a single step, and become essentially complete almost immediately after being compressed upon the cooled mandrel, to form the shape of the roller. The mandrel also provides a base for transport of the roller material towards a fly-away cutter for nearly immediate cutting into the finished product of specified length dimension. Variation in diameter of the mandrel determines the core diameter of the roller and its ultimate finished diameter dimensions.

The superior rollers of the present invention are thus formed with a simplified assembly line and process, comprising:

a) two feeders for the two polypropylene strips,
b) a feeder for the cover strip,
c) a heater for activating an adhesive layer or an extruder for applying an adhesive layer,
d) a stationary cooled mandrel,
e) a transport means such as a helical drive belt to form and advance the endless roller, and
f) a cutter.

The present invention comprises a novel combination using two strips of thermoplastic material, forming the laminate core and paint roller simultaneously, to provide an unexpectedly efficient method and apparatus for making superior paint rollers.

The above and other object, features and advantages of the present invention will become more evident from the following discussion and drawings in which:

DETAILED DESCRIPTION OF THE INVENTION AND THE PREFERRED EMBODIMENTS

Figure 1:
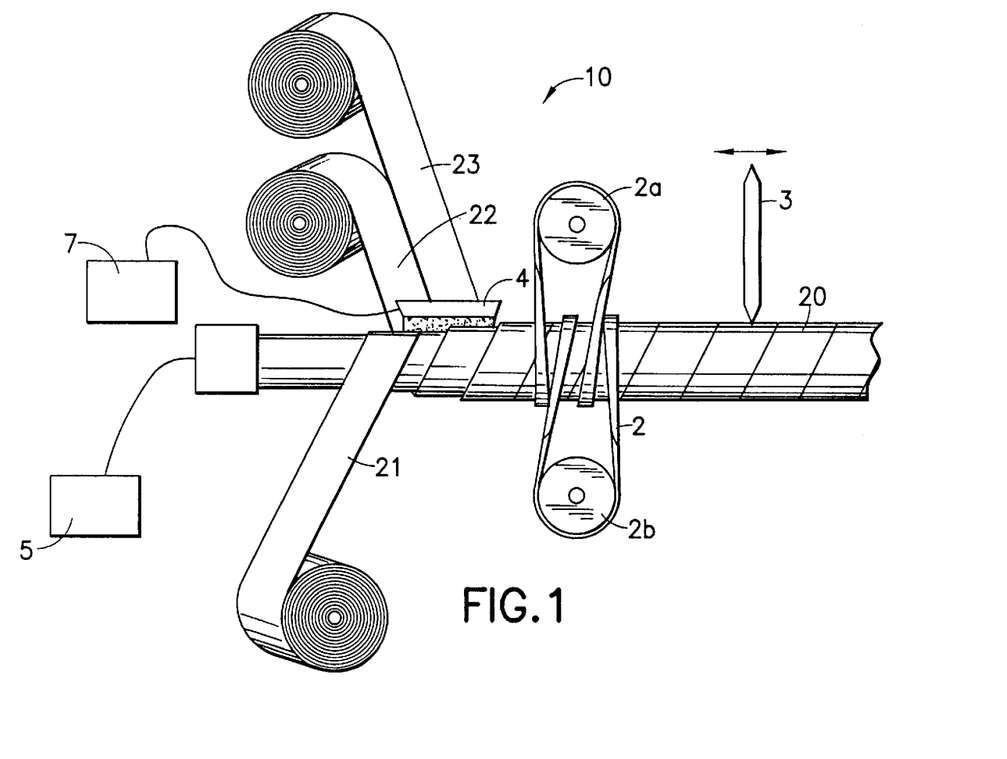
FIG. 1 is a diagrammatic representation of an apparatus suitable for making rollers in accordance with the present invention.

With reference to the drawings, in FIG. 1, a roller forming apparatus 10 comprises a stationary mandrel 1, cooled by cooler 5, on which the roller 20 is formed, helical drive belt 2 moves by between drive rollers 2a and 2b to turn and move the formed endless roller 20 along the mandrel 1 to a fly-away cutter 3.

For ease of discussion in this application, the term "downstream" refers to the direction further along in the roller manufacturing process, or nearer the fly-away cutter 3, while the term "upstream" refers to the direction earlier in the roller manufacturing process, or further from the fly-away cutter 3.

First Embodiment

Figure 2:
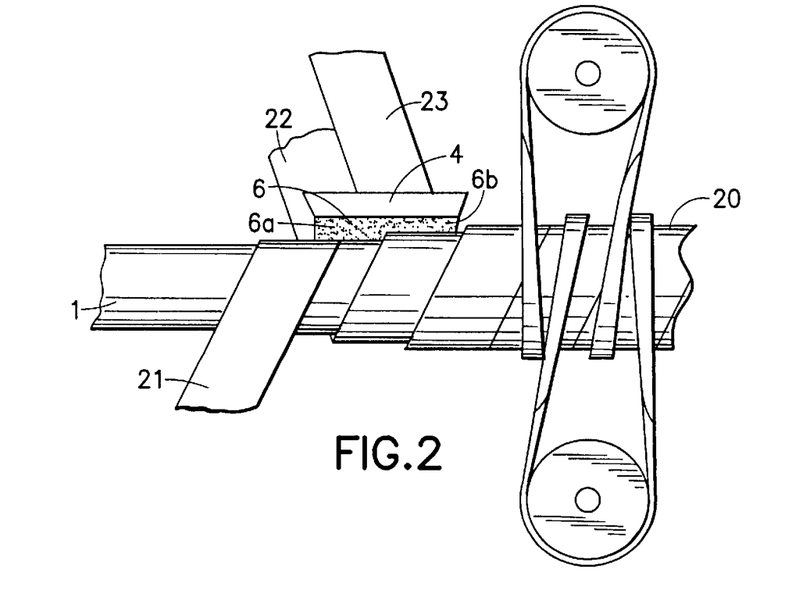
FIG. 2 is an enlarged diagrammatic representation of a first preferred configuration for making rollers in accordance with the present invention.
Figure 2A:
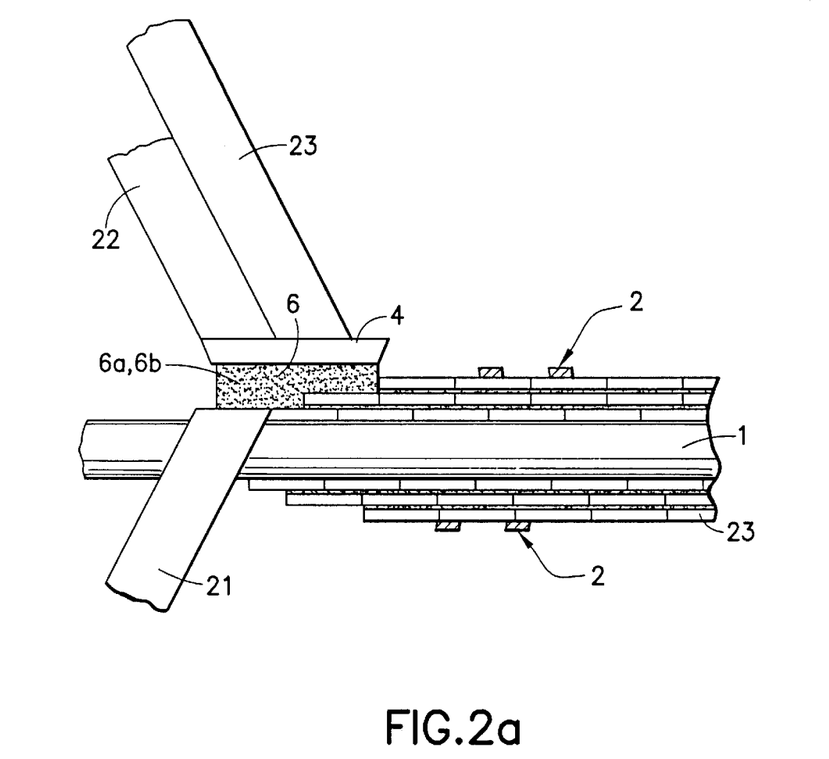
FIG. 2a is a cutaway of the diagrammatic representation shown in FIG. 2.

In a first embodiment, shown in FIG. 1, a detail shown in FIG. 2, and a cutaway detail shown in FIG. 2a, a continuous paint roller is manufactured from an inner strip of thermoplastic material 21, an outer strip of thermoplastic material 22, a cover 23, and an adhesive 6 applied from one or more heads 4. The thermoplastic material is preferably polypropylene. The cover 23 may be a well-known fabric cover for a paint roller, which can be made of polyester.

The inner strip 21 is helically advanced about the mandrel 1. The term helically as used herein means oriented about a mandrel so as to permit the downstream edge of a given wind of a strip to be in closely-spaced or abutting relation with the upstream edge of the preceding wind of the strip. As is well known in the art, a lubricant such as 5% mineral oil may be applied to the inner surface of the inner strip 21 prior to winding on the mandrel 1.

The outer strip 22 is helically advanced about the inner strip 21. Preferably, the edges of the outer strip 22 are offset from the edges of the inner strip 21 as the two strips are advanced along the mandrel 1. The offset between outer strip 22 and inner strip 21 causes outer strip 22 to overlap the portion of the inner strip 21 where its upstream and downstream edges are in closely-spaced or abutting relation. It is believed that the a stronger product is yielded from having an offset between the inner strip 21 and the outer strip 22. An offset of between one-quarter and three-quarters of the width of the inner strip 21 is found to achieve acceptable results.

The cover 23 is helically advanced about the outer strip 22.

The head 4 provides a layer of adhesive material 6 from a source of such material 7, the adhesive material 6 is preferably polypropylene. The source of adhesive material 7 is preferably an extruder, but may be any source of adhesive material including a melter. The head 4 may be any type of head appropriate for providing adhesive material 6 from the source, such as a nozzle or a die. In a preferred embodiment, where the source 7 is an extruder, the head 4 is preferably a die.

Prior to forming the roller, the two layers of adhesive material 6a, 6b must be applied. The first layer of adhesive material 6a is applied so that it will advance between the inner strip 21 and the outer strip 22. The second layer of adhesive material 6b is applied such that it will advance between the outer strip 22 and the cover 23. In a preferred embodiment, the first layer of adhesive material 6a is applied to the outer surface of the inner strip 21, and the second layer of adhesive 6b is applied to the outer surface of the outer strip 22. Both the first and the second layer of adhesive 6a, 6b may be applied from a single head 4. A single head 4 would preferably be placed in a position to permit the adhesive layers 6a, 6b to be applied to the strips 21, 22 as close as is feasible to the cover 23. Preferably, the material would be dispensed from the head 4 with its width being parallel to the direction of the mandrel 1. Care should be taken to prevent any adhesive 6 from contacting the outer surface of the cover 23. While using a single head 4 is believed to provide the easiest setup and yield the most consistent results, two or more heads can be used to apply the layers of adhesive 6a, 6b.

Prior to the hardening and setting of the two layers of adhesive material 6a, 6b, the belt drive 2 applies pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

The width and thickness of the strips 21, 22, and the cover 23 width and pile may be those that are appropriate for manufacture of the desired roller. For example, a typical high quality roller having a 1.5-inch diameter core and a 60-wall can be manufactured with the following materials:

|  | Width | Thickness |
| --- | --- | --- |
| Inner Strip | 2.750" | 0.015" |
| Adhesive Layer One | 2.750" | 0.015" |
| Outer Strip | 2.750" | 0.015" |

-continued

|  | Width | Thickness |
| --- | --- | --- |
| Adhesive Layer Two | 2.750" | 0.015" |
| Cover | 2.875" | Desired Pile |

A typical high quality roller having a 1.5-inch diameter core and an 80-wall can be manufactured with the following materials:

|  | Width | Thickness |
| --- | --- | --- |
| Inner Strip | 2.750" | 0.020" |
| Adhesive Layer One | 2.750" | 0.020" |
| Outer Strip | 2.750" | 0.020" |
| Adhesive Layer Two | 2.750" | 0.015" |
| Cover | 2.875" | Desired Pile |

A typical high quality roller having a 1.5-inch diameter core and a 90-wall can be manufactured with the following materials:

|  | Width | Thickness |
| --- | --- | --- |
| Inner Strip | 2.750" | 0.025" |
| Adhesive Layer One | 2.750" | 0.020" |
| Outer Strip | 2.750" | 0.025" |
| Adhesive Layer Two | 2.750" | 0.020" |
| Cover | 2.875" | Desired Pile |

As used herein, the term "wall" or "mil" means thickness in thousandths of an inch.

Such widths and thickness and the methods of determining them are well known in the art. It will be apparent to one of skill in the art that almost infinite variation is possible depending upon the characteristics of the desired roller.

In addition to the well known high quality roller having a 1.5-inch diameter core, it desirable to manufacture rollers having a 0.5" core. The manufacture of 0.5" core rollers using single strip technology, such as U.S. Pat. No. 5,572,790, has been found not to produce a satisfactory result. Instead, it has been found that the present invention may be applied to 0.5" core rollers. A 0.5" core 60-wall roller can be manufactured, for example, with the following materials:

|  | Width | Thickness |
| --- | --- | --- |
| Inner Strip | 1" | 0.015" |
| Adhesive Layer One | 1" | 0.015" |
| Outer Strip | 1" | 0.015" |
| Adhesive Layer Two | 1" | 0.015" |
| Cover | 1.125" | Desired Pile |

As described above, in a preferred embodiment, a single head 4 may supply both layers of the adhesive 6a, 6b. The width and thickness of the layers 6a, 6b may be varied, but preferably, the width should be substantially the same width as the strips 21, 22. The overall volume of adhesive to be applied must be sufficient to permit bonding of the inner strip 21 to the outer strip 22 and to permit bonding of the cover 23 to the outer strip 22. The amount of adhesive used in the second layer 6b should depend to some extent on the cover 23 material.

A head 4 may be used that is significantly shorter than the preferred width. Using such shorter head 4 may be accommodated by adjusting the flow rate, by shaping the die, by moving the die in a direction along its width or in other ways that are readily apparent to one of skill in the art. Similarly, the invention can be practiced with a head 4 that is significantly longer. Using such a longer head 4 can be accomplished by shaping of the die, or in other ways that are readily apparent to one of skill in the art. Although the invention will accommodate a rather large variation in the width of the head 4, and therefore in the width of material that is supplied by the head 4, it is believed that using a head 4 that provides the desired width of adhesive onto the strips 21, 22 will yield the most consistent results.

It is further possible, without departing from the invention, to use more than one head to apply the adhesive to advance between the strips 21, 22 and to advance between the cover 23 and the outer strip 22. Regardless of the width or number of heads, in order to produce a quality laminated continuous roller, pressure must be applied inwardly upon the cover before the two layers of polypropylene are permitted to harden and set.

The first embodiment orientation of feed for the strips 21, 22 and cover 23, as shown in FIG. 2, permits the cover 23 to be advanced toward the mandrel 1 adjacent and parallel to the outer strip 22. Such positioning permits the use of a single head 4 that can apply adhesive 6a, 6b to the outer surface of the inner strip 21 and to the outer surface of the outer strip 22 simultaneously. Additionally, this positioning permits the adhesive 6a, 6b to be exposed uniformly and for a very short period prior to being sandwiched between the inner and outer strips 21, 22 or the outer strip 22 and the cover 23. Further, this positioning permits a very short assembly line for the continuous manufacturing process.

Second Embodiment

It is believed that providing an offset between the outer strip 22 and the cover 23 could yield an even sturdier product, a Ad method permitting such offset is disclosed. Turning now to a second embodiment, having a detail shown in FIG. 3, a continuous paint roller is manufactured from an inner strip of thermoplastic material 21, an outer strip of thermoplastic material 22, a cover 23, and an adhesive 6 applied from one or more heads 4. The thermoplastic material is preferably polypropylene. The cover 23 may be a well-known fabric cover for a paint roller, which can be made of polyester.

Figure 3:
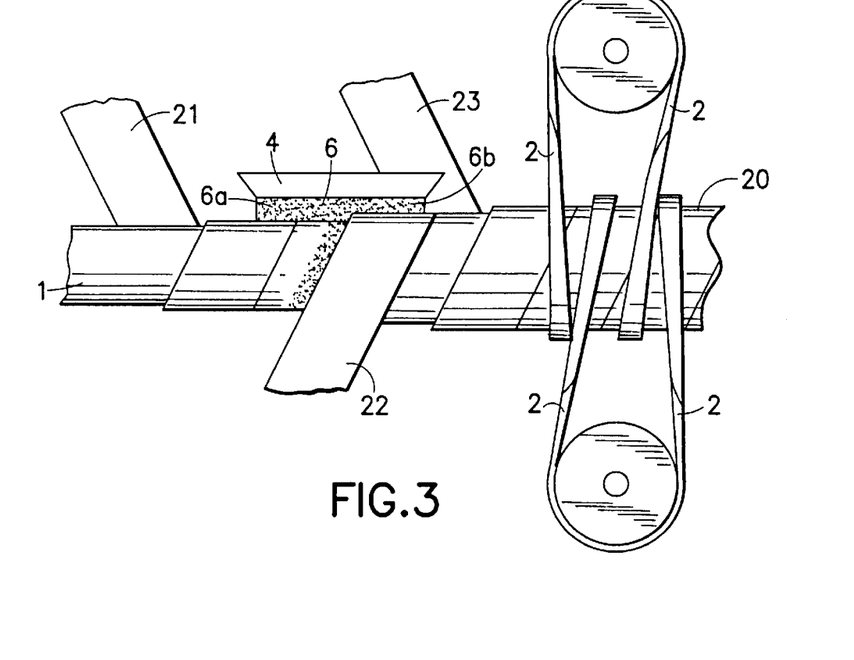
FIG. 3 is an enlarged diagrammatic representation of a second preferred configuration for making rollers in accordance with the present invention.

The second embodiment differs from the first in the orientation of feed for the strips 21, 22 and cover 23. In the second embodiment, the cover 23 is offset from the outer strip 22. The inner strip 21 is helically advanced about the mandrel 1. As is well known, a lubricant may be applied to the inner surface of the inner strip 21 prior to winding on the mandrel 1. The outer strip 22 is helically advanced about the inner strip 21 in offset relation. The cover 23 is helically advanced about the outer strip 22, in offset relation. The head 4 provides adhesive material 6 from a source of such material 7, such as an extruder.

Prior to forming the roller, the two layers of the adhesive material 6a, 6b are applied. The first layer 6a is applied such that it is advanced between the inner strip 21 and the outer strip 22, and the second layer 6b is applied to be advanced between the outer strip 22 and the cover 23. Both the first and the second layer of adhesive 6a, 6b may be applied from a single head 4. A single head 4 would preferably be placed in a position to permit the adhesive to be applied to the strips 21, 22 as close to the location where the cover 23 is wrapped about the outer strip 22. Alternatively, two or more heads 4 can be used to apply the first and second layers of adhesive 6a, 6b.

Prior to the hardening and setting of the two layers of adhesive material 6a, 6b, the belt drive 2 applies pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

The assembly line for this embodiment is somewhat longer than the assembly line for the first embodiment. The additional length of the assembly line, however, may be only one or two inches, or less, so this is not considered significant.

The second embodiment does cause non-uniform exposure of the adhesive layer 6 prior to being sandwiched. The significance of the non-uniform exposure of the adhesive is unknown, however, if it should prove to be a problem, a multi-head system may be used to resolve it. For example, one head 4 may be used for the first layer 6a and a portion of the second layer 6b. A second head 4 may then be used to apply the remaining portion of the second adhesive layer 6b at a slightly higher temperature, thus compensating for the difference in exposure.

Third Embodiment

Figure 4:
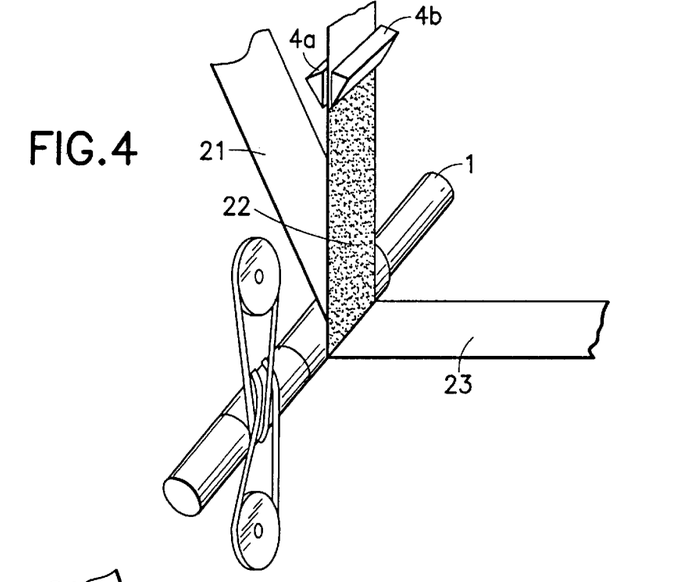
FIG. 4 is an enlarged diagrammatic representation of a third preferred configuration for making rollers in accordance with the present invention.

Turning now to a third embodiment, having a detail shown in FIG. 4, a continuous paint roller is manufactured from an inner strip of thermoplastic material 21, an outer strip of thermoplastic material 22, a cover 23, and an adhesive (not shown) applied from two heads 4a and 4b. The thermoplastic material is preferably polypropylene. The cover 23 may be a well-known fabric cover for a paint roller, which can be made of polyester.

The third embodiment differs from the first two in the orientation of feed for the strips 21, 22 and cover 23. The third embodiment consists of the shortest assembly line.

The inner strip 21 is helically advanced about the mandrel 1. As is well known, a lubricant may be applied to the inner surface of the inner strip 21 prior to winding on the mandrel 1. The outer strip 22 is helically advanced about the inner strip 21 in offset relation. The cover 23 is helically advanced about the outer strip 22, the cover may but need not be in offset relation.

Prior to forming the roller, two layers of the adhesive material (not shown) are applied. Two heads 4a, 4b provide adhesive material from a source of such material 7, such as an extruder. Head 4a applies a first layer of the adhesive to the inner surface of outer strip 22, while head 4b applies a second layer material to the outer surface of the outer strip 21.

Prior to the hardening and setting of the two layers of adhesive material, the belt drive 2 applies pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

Fourth Embodiment

Figure 5:
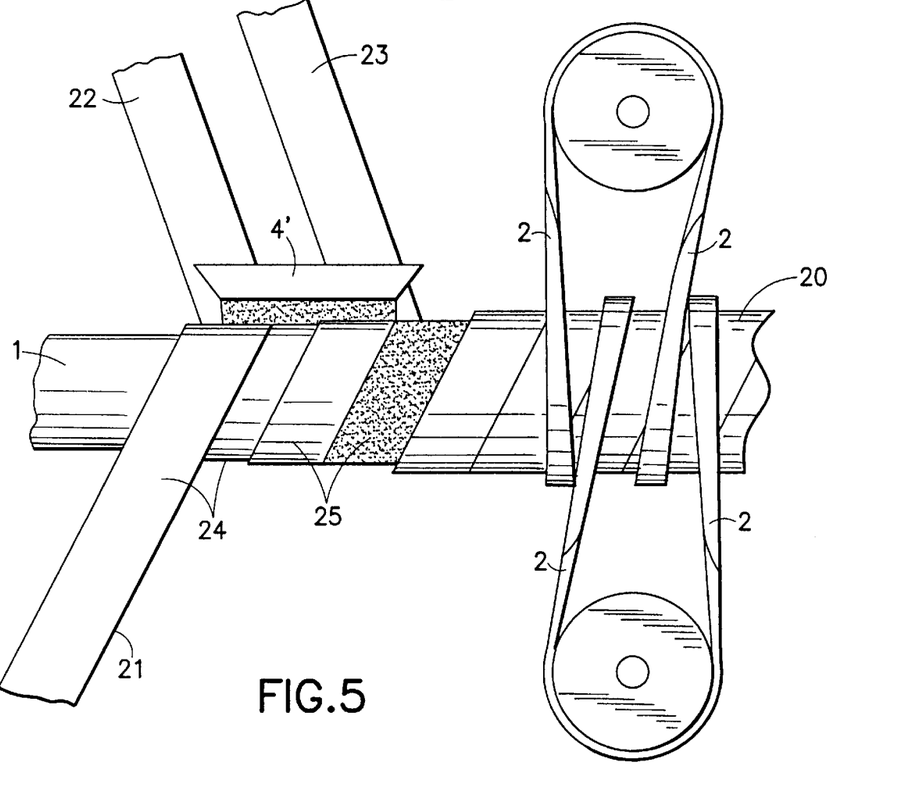
FIG. 5 is an enlarged diagrammatic representation of a fourth preferred configuration for making rollers in accordance with the present invention.

A fourth embodiment of the present invention will be described with reference to FIG. 5, a continuous paint roller is manufactured from an inner strip of thermoplastic material 21, an outer strip of thermoplastic material 22, a cover 23, and a head 4. The thermoplastic material is preferably polypropylene. The cover 23 may be a well-known fabric cover for a paint roller, which can be made of polyester.

A first adhesive layer 24 is present on the outer surface of the inner strip 21, and a second adhesive layer 25 is present on the outer surface of the outer strip 22. The adhesive layers preferably comprise polypropylene. Although this embodiment is so described, it is within the skill of the art to recognize that the first and second adhesive layers 24, 25 could also be placed, on the inner surface of the outer strip 22 and on the inner surface of the cover 23, respectively. It is only important that the head 4' is able to activate the adhesive layers 24, 25, and that the adhesive layers 24, 25 will become sandwiched between the inner strip 21 and the outer strip 22, and the outer strip 22 and the cover 23, respectively.

The inner strip 21 is helically advanced about the mandrel 1. As is well-known, a lubricant may be applied to the inner surface of the inner strip 21 prior to advancing. The outer strip 22 is helically advanced about the inner strip 21, in offset relation. The cover 23 is helically advanced about the outer strip 22.

The head 4' provides heat. The head 4' may be an electric heater, it may be gas operated, or it may be any other type of heater appropriate for activating the adhesive layers 24, 25 on the strips 21, 22. (An adhesive layer is activated by being liquefied, that is, brought into a tacky, molten state.) Prior to forming the roller, two layers of adhesive 24, 25 are activated by the head 4'. Both the first and the second layer of adhesive 24, 25 may be activated from the single head 4'. The head 4' would preferably be placed in a position to permit the adhesive to be activated on the strips 21, 22 within the region designated by the measurement A in the FIG. 2. Preferably, the head 4' is oriented parallel to the direction of the mandrel 1. Care should be taken to prevent the heat emanating from the head 4' from heating the outer surface of the cover 23 to a degree that would melt or otherwise adversely affect its properties. In order to prevent such damage to the cover 23, the cover 23 is advanced about the outer strip 23 a wind downstream from the head 4'. Alternatively, a heat shield (not shown) may be employed. While using a single head 4' is believed to provide the easiest setup and yield the most consistent results, two or more heat sources can be used to activate the layers of adhesive.

Prior to the hardening and setting of the two layers of adhesive 24, 25, a belt drive 2 is used to apply pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

Fifth Embodiment

Figure 6:
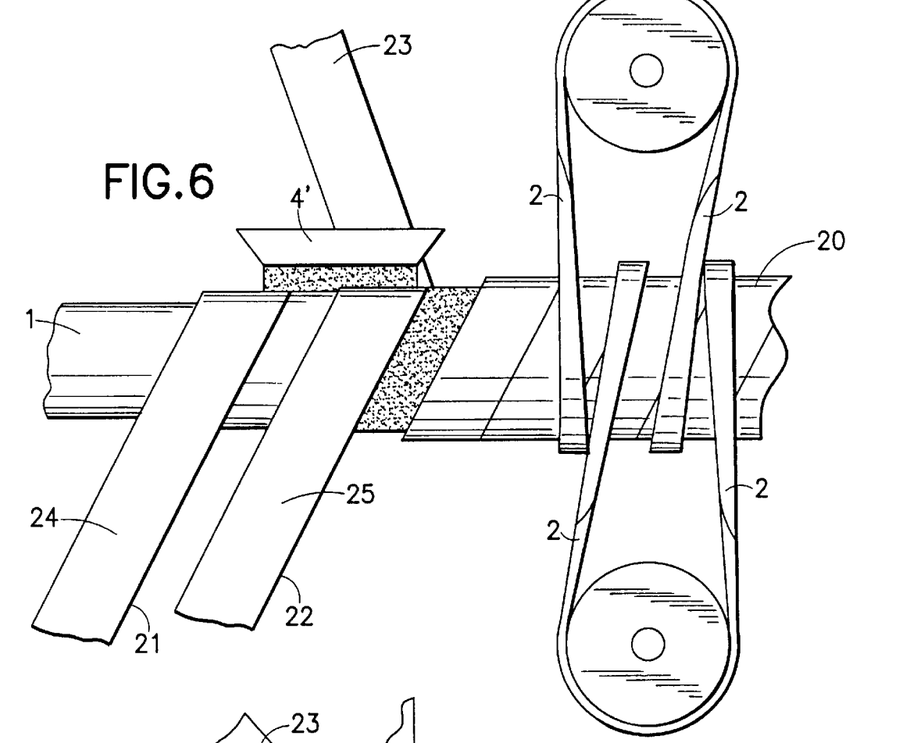
FIG. 6 is an enlarged diagrammatic representation of a fifth preferred configuration for making rollers in accordance with the present invention.

A fifth embodiment of the present invention will be described with reference to FIG. 6, a continuous paint roller is manufactured from an inner strip of thermoplastic material 21, an outer strip of thermoplastic material 22, a cover 23, and a head 4'. The fifth embodiment differs from the fourth embodiment in that the cover 23 is offset from the outer strip 22. In this embodiment the cover 23 is spaced on one-half wind from the head 4'. This is thought to present an advantage in that the cover 23 is closer to the head 4', but no heat shield is likely to be required.

Sixth Embodiment

Figure 7:
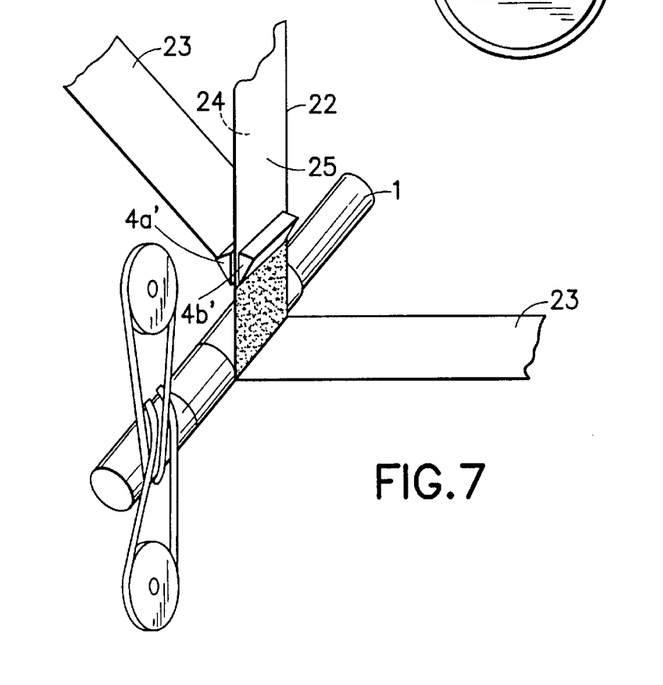
FIG. 7 is an enlarged diagrammatic representation of a sixth preferred configuration for making rollers in accordance with the present invention.

A sixth embodiment of the present invention is described with reference to FIG. 7, a continuous paint roller is manufactured from an inner strip of thermoplastic material 21, an outer strip of thermoplastic material 22, a cover 23, and two heads 4a', 4b'.

A first adhesive layer 24 is present on the inner surface of the outer strip 22, and a second adhesive layer 25 is present on the outer surface of the outer strip 22. The adhesive layers preferably comprise polypropylene.

The inner strip 21 is helically advanced about the mandrel 1. The outer strip 22 is helically advanced about the inner strip 21, in offset relation. The cover 23 is helically advanced about the outer strip 22. Two heads 4a', 4b' provide heat to activate the two adhesive layers 24, 25. The heads 4a', 4b' may be electric heaters, gas operated, or any other type of heater appropriate for activating the adhesive layers 24, 25 on the strips 21, 22.

Prior to forming the roller, two layers of adhesive 24, 25 are activated by the heads 4a', 4b'. The heads 4a', 4b' are preferably be placed in a position to permit the adhesive layers 24, 25 to be activated at a point close to where the outer strip 22 is advanced about the inner strip 21. Preferably, the heads 4a', 4b' are oriented in a direction perpendicular to the length of the outer strip 22. Care should be taken to prevent the heat emanating from the heads 4a', 4b' from heating the cover 23 to a degree that would melt or otherwise adversely affect its properties. A heat shield (not shown) may be employed.

Prior to the hardening and setting of the two layers of adhesive 24, 25, a belt drive 2 is used to apply pressure to the outer surface of the cover 23, imparting inward forces on the component parts, and thereby forming the continuous roller about the mandrel. In addition to forming the roller, the belt drive 2 advances the thus-formed endless roller along the mandrel, and continuously rotates the endless roller, thereby also advancing the strips 21, 22 and the cover 23 toward and around the mandrel.

While providing both adhesive layers 24, 25 on the outer strip 22 is believed to provide the easiest setup and yield the most consistent results, it is within the scope of the invention to provide and activate the first adhesive layer 24 on the outer surface of the inner strip 21. It is also within the scope of the invention to split the first adhesive layer 24 between the inner surface of the outer strip 22 and the outer surface of the inner strip 21. Having so split the adhesive layer 24, either multiple heads 4a may be employed, or alternatively, a single head 4a' could be located near the point where the inner strip 21 and the outer strip 22 first make contact.

In making the inventive paint roller using the process described herein, it is desirable to have the belt drive 2 closely follow the point in the manufacturing process at which the cover is wrapped. Preferably, the belt drive 2 immediately follows such wrapping thus permitting the belt drive 2 to impart physical force to the component parts before the thermoplastic hardens and sets, thereby creating an endless roller 20. Permitting the belt drive 2 to act on the not-yet completely set roller has been found to provide a superior roller 20.

As is well known in the art, the endless roller 20 may be cut by the fly-away saw 3 into lengths after it has set sufficiently.

Employing the present invention, the entire length of the assembly line required to manufacture superior quality paint rollers can have less than 20 inches of mandrel 1, and less than 20 inches between the belt drive 2 and the fly-away saw 3.

Figure 8A:
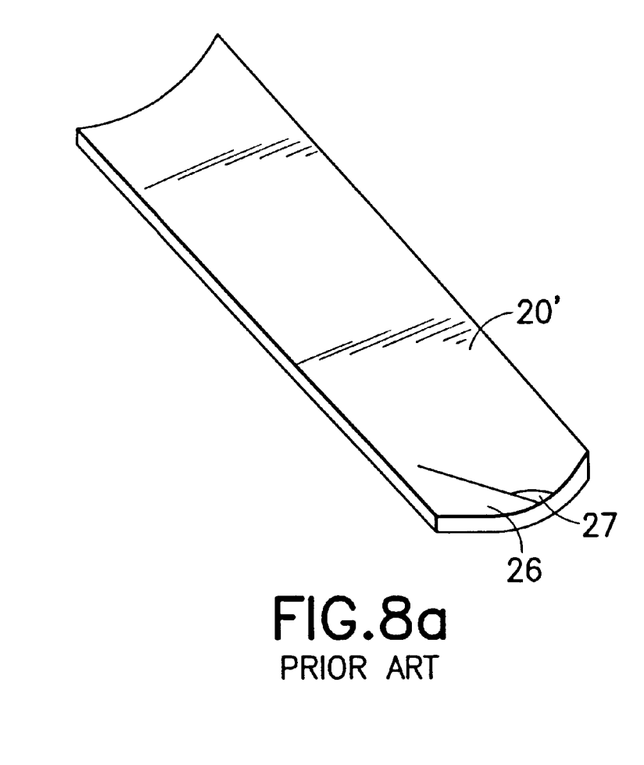
FIGS. 8a and 8b are perspective views of rollers made in accordance with the prior art and the present invention respectively after having been longitudinally slit.
Figure 8B:
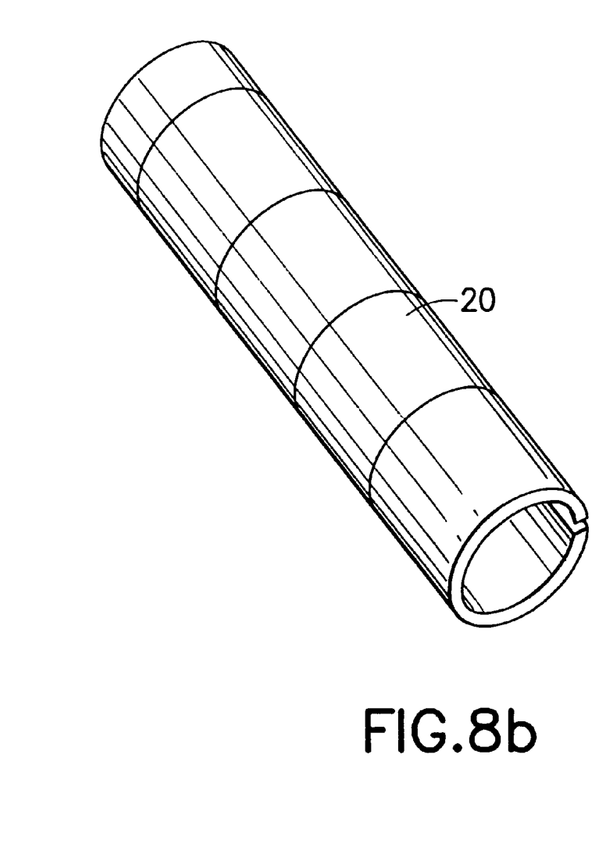

Aside from the rapidity in which completed rollers are formed with minimal line equipment, the rollers formed are of superior structural integrity. As seen in FIGS. 8a and 8b slit rollers 20 (present invention) and 20' (single strip prior art) differ in shape. The prior art roller 20', with a longitudinal cut experiences an unwinding force retained by the roller and springs open to a shallow curve section. This is indicative of constant hoop forces operating against the core structure thereby causing end sections 24 to separate from adjacent section 26 in an unsightly fashion. In addition the high hoop forces render the manufacture of smaller diameter single strip roller almost infeasible both in terms of integrity and proper construction. In contrast roller 20 of the present invention experiences little or no unfurling even with smaller diameter roll cores. This is believed to result, at least in part, from the laminating effect of the multiple usually thinner strips.

An unexpected benefit of the instant process is that the cost is significantly less than the cost for manufacturing a comparable roller using single strip technology such as U.S. Pat. No. 5,572,790. The cost benefit results from the fact that polypropylene extruded into strip form is significantly more expensive by the pound than polypropylene in pellet form, which latter form is used in an extruder to form the adhesive. With a laminated process, two layers of adhesive between 0.15" and 0.25" are applied, whereas, with the single strip process, the maximum layer of adhesive is 0.25". Thus, to make almost any roller, the amount of extruded polypropylene can be reduced, and a better yet less expensive produce can be produced.

As the number of strips rise, so too does the complexity of the process. Accordingly, the manufacture of four, five or more strip products is not likely to be feasible. Moreover, the present invention permits the use of a single head for the application of adhesive. A process having three or more strips of polypropylene would require at least two heads.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The most obvious variations to the present invention include variation in the placement or orientation of the strips 21, 22 and the cover 23 and variations in the placement of the head 4, 4', 4a, 4b. It is understood that the above description and drawings are merely illustrative of the present invention and that changes in components, structure and procedure are possible without departing from the scope of the present invention as defined in the following claims.

What is claimed is:

1. A method for producing a paint roller in a single continuous integrated operation comprising the steps of:

a. initially angularly feeding a first polypropylene strip to a mandrel support member, and thereafter, with an offset from the angular feeding of the first polypropylene strip, angularly feeding a second polypropylene strip onto an outer surface of the first polypropylene strip, and angularly feeding a paint roller cover strip, onto an outer surface of the second polypropylene strip,    b. after the initial feeding of the respective strips to the mandrel, moving the respectively fed strips in both a rotational direction about the mandrel and simultaneously along the length of the mandrel, while continuously applying a layer of adhesive to the first and second strips, the layer of adhesive spanning at least a portion of an exposed outer surface of a winding of the first polypropylene strip and at least a portion of an exposed outer surface of a winding of the second polypropylene strip, adjacent thereto, with the layer of adhesive not contacting an outer surface of the cover strip;

wherein movement and application of the layer of adhesive to the adjacent windings of first and second polypropylene strips effects continuous adhesion between first and second polypropylene strips and between the second polypropylene strip and cover strip to continuously form the core and cover of the paint roller.

2. The method of claim 1, wherein the cover strip and adjacent adhered second polypropylene strip are laterally offset from each other whereby the cover strip spans adjacent winding of the second polypropylene strip, thereby providing additional structural strength in maintaining the rigidity of the roller.

3. A method for producing a continuous multi-strip laminate paint roller comprising the steps of:
feeding a first strip of thermoplastic material about a mandrel;
feeding a second strip of thermoplastic material about the first strip of thermoplastic material in offset relation therewith;
applying adhesive upon, at least:
a portion of the outer surface of one wind of the first strip,
an adjacent portion of the outer surface of a subsequent wind of the first strip, and
substantially all of the outer surface of a wind of the second strip;
feeding a cover about the second strip; and
applying a compressing force upon the cover urging the cover toward the second strip and simultaneously urging the second strip toward the first strip, thereby creating the continuous multi-strip laminated paint roller.

4. The method claimed in claim 3, further comprising the step of:
applying upon the cover a rotational force and a linear force parallel to the mandrel, thereby urging the continuous multi-strip laminated paint roller to rotate about and move along the mandrel.

5. The method claimed in claim 4, wherein the compressing force, the rotational force and the linear force are all imparted through a helical belt system.

6. The method claimed in claim 5 further comprising the step of:
cutting the continuously multi-strip laminated paint roller into lengths.

7. The method claimed in claim 3 further comprising the step of:
cutting the continuously multi-strip laminated paint roller into lengths.

8. The method claimed in claim 3 wherein the thermoplastic material is polypropylene.

9. The method claimed in claim 8 wherein the adhesive is liquid polypropylene.

10. The method claimed in claim 9 wherein the second strip is offset from the first strip by between ¼ and ¾ of the first strip.

11. The method claimed in claim 10 wherein the cover is wound in offset relation with the second strip.

12. The method claimed in claim 11 wherein the cover is offset from the second strip by between ¼ and ¾ of the second strip.

13. The method claimed in claim 9, further comprising the steps of:
applying upon the cover a rotational force and a linear force parallel to the mandrel, thereby urging the continuous multi-strip laminated paint roller to rotate about and move along the mandrel.

14. The method claimed in claim 13 wherein the compressing force, the rotational force and the linear force are imparted through the use of a belt.

15. The method claimed in claim 13, further comprising the steps of:
cutting the continuously formed paint roller into substantially equal lengths; and
cutting the substantially equal lengths into usable lengths.

16. The method claimed in claim 3 wherein the cover is wound in offset relation with the second strip.

17. The method claimed in claim 3, wherein the diameter of the mandrel ranges between 0.5 inches and 1.5 inches.

18. The method claimed in claim 3, wherein the diameter of the mandrel is approximately 0.5 inches, thereby forming a roller with the inner diameter of approximately 0.5 inches.

19. A method for continuously producing a multi-strip laminate paint roller comprising the steps of:
helically advancing a first strip of polypropylene material about a mandrel, the first strip having an inner and an outer surface;
applying an adhesive to the outer surface of the first strip at a location where the inner surface of the first strip is in contact with the mandrel;
helically advancing a second strip of polypropylene material about the first strip, thereby covering the adhesive on the outer surface of the first strip, the second strip being helically wound in offset relation to the first strip and the second strip having an inner and an outer surface;
applying an adhesive to the outer surface of the second strip;
helically advancing a cover strip about the second strip, thereby covering the adhesive on the outer surface of the second strip;
applying a compressing force upon the cover urging the cover toward the second strip and simultaneously urging the second strip toward the first strip, thereby creating the continuous laminated paint roller.

20. The method claimed in claim 19, further comprising the step of:
applying upon the cover a rotational force and a linear force parallel to the mandrel, thereby urging the continuous multi-strip laminated paint roller to rotate about and move along the mandrel.

21. The method claimed in claim 20, wherein the compressing force, the rotational force and the linear force are all imparted through a helical belt system.

22. The method claimed in claim 19, wherein the diameter of the mandrel is approximately 0.5 inches, thereby forming a roller with the inner diameter of approximately 0.5 inches.

23. A method for continuously producing a multi-strip laminate paint roller comprising the steps of:
helically advancing an inner strip and an outer strip of polypropylene material about a mandrel in offset relation;
applying a layer of liquid polypropylene material between the two strips and on the outer surface of the outer strip;
prior to permitting the layer of liquid polypropylene to harden and set, wrapping a cover around the outer strip and applying a compressing force upon the cover urging the cover and the two strips toward the mandrel, thereby creating the continuous laminated paint roller.

24. The method claimed in claim 23, further comprising the step of:

applying upon the cover a rotational force and a linear force parallel to the mandrel, thereby urging the continuous multi-strip laminated paint roller to rotate about and move along the mandrel.

25. The method claimed in claim 24, wherein the compressing force, the rotational force and the linear force are all imparted through a helical belt system.

26. The method claimed in claim 23, wherein the diameter of the mandrel is approximately 0.5 inches, thereby forming a roller with the inner diameter of approximately 0.5 inches.

27. A continuous process for producing an endless multi-strip laminate paint roller comprising the steps of:

advancing a first strip of polypropylene material about a mandrel, the first strip having a first layer of adhesive along its outer surface;

advancing a second strip of polypropylene material about the first strip in offset relation therewith, the second strip having a second layer of adhesive along its outer surface;

advancing a cover about the second strip; and continuously activating the advancing first layer of adhesive at a point in the process prior to the location where the advancing second strip makes contact with the first strip;

continuously activating the advancing second layer of adhesive at a point in the process prior to the location where the advancing cover makes contact with the second strip;

applying a compressing force upon the cover urging the cover toward the second strip and simultaneously urging the second strip toward the first strip, thereby creating the continuous multi-strip laminated paint roller.

28. The process claimed in claim 27 wherein the adhesive is liquid polypropylene.

29. The process claimed in claim 28, wherein the compressing force is imparted through a helical belt system.

30. The process claimed in claim 29 wherein the second strip is offset from the first strip by between ¼ and ¾ of the first strip.

31. The process claimed in claim 28, further comprising the steps of:

cutting the continuously formed paint roller into substantially equal lengths; and     cutting the substantially equal lengths into usable lengths.

32. The process claimed in claim 28, wherein the diameter of the mandrel is approximately 0.5 inches, thereby forming a roller with the inner diameter of approximately 0.5 inches.

33. A method for continuously producing a multi-strip laminate paint roller comprising the steps of:

helically advancing a first strip of polypropylene material about a mandrel, the first strip having an inner and an outer surface and a first layer of adhesive upon its outer surface;

continuously activating the first layer of adhesive at a location on the first strip where the inner surface of the first strip is in contact with the mandrel;

helically advancing a second strip of polypropylene material about the first strip over the activated first layer of adhesive, the second strip being helically advanced in offset relation to the first strip, the second strip having an inner and an outer surface and a second layer of adhesive upon its outer surface;

continuously activating the second layer of adhesive at a location on the second strip where the inner surface of the second strip is in contact with the first layer of adhesive;

helically advancing a cover strip about the second strip, thereby covering the adhesive on the outer surface of the second strip;

applying a compressing force upon the cover urging the cover toward the second strip and simultaneously urging the second strip toward the first strip, thereby creating the continuous laminated paint roller.

34. The method claimed in claim 33, wherein the first and second layers of adhesive are activated by a single heating means at an adjoining location.

35. The method claimed in claim 34, wherein the compressing force is imparted through a helical belt system.

36. The method claimed in claim 33, wherein the diameter of the mandrel is approximately 0.5 inches, thereby forming a roller with the inner diameter of approximately 0.5 inches.

37. A method for continuously producing a multi-strip laminate paint roller comprising the steps of:

helically advancing an inner strip and an outer strip of polypropylene material and a cover about a mandrel in offset relation, where at least one of the outer surface of the inner strip and the inner surface of the outer strip comprise a first layer of adhesive, and where at least one of the outer surface of the outer strip and the inner surface of the cover comprise a second layer of adhesive;

activating the first and second layers of adhesive; and prior to permitting the first and second layers of adhesive to harden and set, applying a compressing force upon the cover urging the cover and the two strips toward the mandrel, thereby creating the continuous laminated paint roller.

38. The method claimed in claim 37, wherein the compressing force, the rotational force and the linear force are all imparted through a helical belt system.

39. The method claimed in claim 37, wherein the diameter of the mandrel is approximately 0.5 inches, thereby forming a roller with the inner diameter of approximately 0.5 inches.

\* \* \* \* \*